United States Patent Office 3,410,884
Patented Nov. 12, 1968

3,410,884
DIHYDROCARBON TIN MERCAPTIDES
Gerry P. Mack, Jackson Heights, N.Y., assignor, by mesne assignments, to M & T Chemicals Inc., New York, N.Y., a corporation of Delaware
No Drawing. Filed Sept. 25, 1962, Ser. No. 226,159
6 Claims. (Cl. 260—429.7)

This invention relates to novel organotin compounds and to resin compositions which have been stabilized therewith.

As is well known to those skilled in the art, various halogen-containing resins, particularly vinyl halide resins which include homopolymers of vinyl chloride and copolymers of vinyl chloride with other monomers, may degrade when subjected to heat over an extended period of time. Such degradation may be evidenced by darkening of the resin and by an increase in brittleness. These defects may render the resin unsuitable for many uses since the darkening produces an unsightly appearance, and the increased brittleness may cause mechanical failures. A wide variety of materials has heretofore been employed to stabilize halogen-containing resins. Many of these additives have achieved some measure of success in stabilizing halogen-containing resins against the degradative action of heat, but there are many applications in which a greater degree of heat stability is desired than has heretofore been possible to obtain.

It is an object of this invention to provide novel organotin compounds having tin-sulfur linkages, which compounds may be stabilizers for resins. It is another object of this invention to provide a process for preparing these novel compounds. It is a further object of this invention to provide halogen-containing resins particularly stable against heat deterioration. Other objects of this invention will be apparent to those skilled in the art on inspection of the following description.

In accordance with certain of its aspects, the process of this invention for preparing dihydrocarbontin dialkylbenzene α,α'-dimercaptides comprises mixing substantially equimolar portions of a dihydrocarbontin oxide and an α,α'-dimercaptodialkylbenzene in the presence of an inert diluent, thereby forming a reaction mixture; heating said reaction mixture to at least about 60° C., thereby forming product dihydrocarbontin dialkylbenzene α,α'-dimercaptide and by-product water; stripping said by-product water from said reaction mixture; and stripping said inert diluent from said reaction mixture, thereby isolating said product dihydrocarbontin dialkylbenzene α,α'-dimercaptide.

The raw material α,α'-dimercaptodialkylbenzene which may be employed in practice of this invention may have the formula

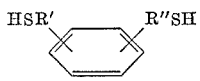

wherein R' and R" may be alkyl radicals having two free valence bonds. Preferably they may be alkyl radicals containing less than 4 carbon atoms. The preferred alkyl radicals may be methyl, ethyl, and propyl. The two mercapto alkyl groups, HSR'—, may be positioned in the benzene ring at desired positions o, m, or p, to each other. Mixtures of these isomers may also be employed. The benzene ring may contain other inert substituents typified by a methyl group. In the preferred embodiment, R' and R" may be the same and both may be methyl. The preferred starting compound may be, e.g. α,α'-dimercapto-p-xylene. These raw materials may be commercially available or they may be prepared by processes well known to those skilled in the art. For example, the preferred α,α'-dimercapto-p-xylene may be prepared by the reaction of commercially available α,α'-dichloro-p-xylene with sodium hydrosulfide. Typically this reaction may be effected by addition of one mole of the dichloroxylene to two moles of the sulfide according to the following equation:

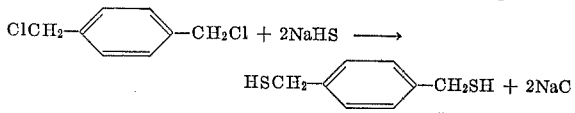

The other reactant which may be employed in practice of this invention, the dihydrocarbontin oxide, typically having the formula R₂SnO, may be a compound wherein R may be a hydrocarbon radical. Typically, R may be selected from the group consisting of alkyl, aryl, cycloalkyl, alkenyl, aralkyl, and alkaryl radicals. Preferably, the R radical may be a lower alkyl radical, typically methy, ethyl, butyl, isobutyl, tert-butyl, amyl, hexyl, heptyl, octyl, nonyl, dodecyl. The most preferred R radicals may be the octyl and butyl radicals. The most preferred R₂SnO compounds may be dibutyltin oxide and dioctyltin oxide.

Reaction of these aforementioned raw materials may be effected by mixing preferably equimolar portions of each in the presence of an excess of inert diluent. Said inert diluent will preferably be a liquid at the reaction temperature. It may also preferably be a good solvent for at least one of the aforementioned raw materials typically the α,α'-dimercaptodialkylbenzene. Preferably, the inert diluent may be a good solvent for the reaction product dihydrocarbontin dialkylbenzene α,α'-dimercaptide. The most suitable inert diluents may be those liquid diluents which azeotrope with water. When such diluents are employed, the removal of by-product water from the reaction mixture may be greatly facilitated and the reaction may be driven more easily to completion.

Preferred inert diluents may include liquid hydrocarbons typified by benzene, toluene, petroleum naptha, hexane, heptane, etc. Preferably, the diluent which may be employed may be one which has a boiling point of at least about 60° C. and preferably less than about 150° C. at atmospheric pressure. Preferred inert diluents may include toluene and benzene which have boiling points of 110°C. and 80° C., respectively. Preferably, the amount of inert diluent which may be employed will be an amount sufficient to permit attainment of a fluid reaction mixture wherein the normally solid or low melting charge materials may be dispersed or dissolved. In the preferred embodiment, the amount of inert diluent which may be present may be about 0.3 to 15, say 5 parts by weight per part by weight of total raw materials.

Reaction of the raw materials with each other may be effected by heating the reaction mixture. Preferably, the mixture may be heated to a temperature of at least 60° C. and preferably to a temperature which may be below the reflux temperature of the mixture e.g. about 120° C. During the reaction period, the reaction mixture may be heated to higher temperatures but no compensating advantage may thereby be obtained. The reaction mixture may be maintained at this reaction temperature for at least about 5 minutes, and preferably less than about 30 minutes. Typically, the reaction may be effected in 10–15 minutes. Typically, the completion of reaction may be observed by the disappearance or substantial lessening of the milky, turbid appearance of the mixture which may be derived from the presence of unreacted and undissolved dihydrocarbontin oxide. In some embodiments of this invention, the attainment of a substantially clear solution may represent the preferred end of the reaction period.

The reaction mixture, now containing the desired product together with by-product water and excess of inert diluent, may be heated to refluxing temperature at which point water and diluent may be removed from the reaction mixture. Preferably, the diluent and by-product water may be azeotropically distilled into a Dean-Stark trap, and the inert diluent may be returned to the reaction mixture until no more water is found in the distillate. After this point, the reaction mixture may be maintained at distillation temperature and the remainder of inert diluent may be stripped. Although it may be most convenient to remove by-product water and diluent at atmospheric pressure, lower pressure may be employed.

Depending upon the size of the run and the particular heating technique employed, it may be possible to continually heat the reaction mixture from its initial run temperature to refluxing temperature without necessarily employing separate steps, i.e. the time which it may take to heat the reaction mixture through the reaction temperature range may be sufficiently long to permit substantial completion of the reaction and in this case it will not be necessary to separate the reaction mixture in the noted range.

The product produced may be obtained as residue from the distillation, typically in the form of a white-to-light yellow very viscous liquid at the higher temperature at which it may be obtained. On cooling, it may become a very viscous liquid which possesses little or no fluidity at room temperature of 20° C. On heating to elevated temperature, typically about 50° C., it may become sufficiently fluid to permit ready pouring into desired vessels.

Analysis of the product dihydrocarbontin dialkylbenzene α,α'-dimercaptide indicates that it contains 2 sulfur atoms per tin atom, and that there are no free SH groups attached to the molecule. It is believed that a substantial portion of the reaction product may be present as a cyclic dimer having the configuration.

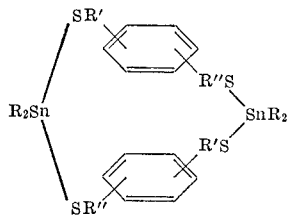

Other configurations such as linear polymers and cyclic structures of higher order, e.g. trimers, tetramers, etc., are also contemplated. When the α,α'-dimercaptodialkylbenzene employed is an ortho- or meta-substituted benzene, it may be possible to form a cyclic structure having the configuration:

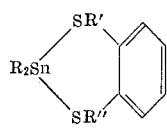

The structure shown is for the orthoisomer. Similar cyclic structures may be found when the meta isomer is employed. Thus, the dihydrocarbontin dialkylbenzene α,α'-dimercaptide products of the invention may be represented by the general formula:

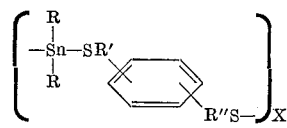

wherein X is at least one and R, R' and R" are as defined supra. This general formula includes the cyclic products and polymeric products.

It is most probable that the product obtained by the process of this invention may be a mixture of the various possible structures. Where the term "dihydrocarbontin dialkylbenzene α,α'-dimercaptide" is employed, it is understood to encompass all of these configurations and mixtures thereof.

It is a particular feature of this invention that these novel products may be employed to treat halogen-containing resin compositions to render them unexpectedly stable to heat deterioration. The preferred resins which may be stabilized in accordance with practice of this invention may be polymers of vinyl chloride including vinyl chloride homopolymers and copolymers of vinyl chloride with other monomers including vinyl acetate, vinylidene chloride, acrylonitrile, etc. A preferred vinyl chloride polymer which may be stabilized according to the practice of this invention may be a homopolymer of vinyl chloride such as that sold under the trademark Geon 103EP which has a specific gravity of 1.40, a Shore durometer D hardness of 80 and an ultimate tensile strength of about 7000 p.s.i.

In accordance with practice of this invention, these resin compositions may be rendered heat stable by addition thereto of stabilizing amounts, typically 0.5%–10%, preferably 2%–4% by weight of the novel products of this invention. The preferred novel products which may be employed may include those formed by the reaction of $R_2SnO$ wherein R may be an alkyl radical including cycloalkyl and aralkyl radicals with the compound

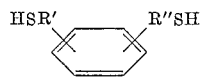

Incorporation of these novel products into the resin may typically be effected by mixing 100 parts by weight of resin with e.g. 2.0 parts by weight of stabilizer. The mixture may then be milled for the desired time, typically 5 minutes, on a 2-roll differential speed mill heated to 177° C. and removed as a sheet. Portions of the sheet may then be cut into test sections of 2.54 cm. x 2.54 cm. and these test sections placed on pans in an oven through which circulating air may be passed at 190° C. Samples may be removed from the oven after periods of 15 minutes, 30 minutes, 45 minutes, 60 minutes, 75 minutes, and thereafter at 15 minute intervals if the test be not then completed. Samples are rated on an arbitrary scale ranging from 1–7 whereon a rating of 7 is equivalent to a clear water-white sheet. A rating of 6 may be defined as an off-white. A rating of 5 is characterized by the slightest degree of yellowing. A rating of 4 is characterized by a definite yellow color. A rating of 3 is characterized by a deep yellow-brown color. A rating of 2 is characterized by a deep brown color. A rating of 1 may be characterized by being dark brown to black in color. Normally a sample may be considered to have reached the end of its test when the color rating thereof is below 3.

The following examples illustrate the practice of this invention and the advantages realized thereby.

EXAMPLE 1

89.4 gm. (0.5 mole) of a commercial sample of α,α'-dimercapto-p-xylene, having a purity of 94.5% and 100 cc. of benzene were placed in a three-neck flask equipped with a stirrer, heating mantle, and a Dean-Stark trap. The mixture was heated to 65° C., and 126.3 gm. (0.5 mole) of 98.5% pure di-n-butyltin oxide was added. The total mixture was heated to reflux (85–95° C.) water was collected in the Dean-Stark trap. When the evolution of water ceased, the trap was removed, and the remaining solvent benzene was stripped under vacuum. The product dibutyltin p-xylene α,α'-dimercaptide, obtained in substantially stoichiometric yield was a viscous, slightly opaque liquid. Analysis of this material gave 28.69% tin (29.6% theory), 16.05% mercaptide sulfur (16.03% theory) and a molecular weight of 925.

Other compounds may be prepared in substantially stoichiometric yield in accordance with practice of this invention by using a similar technique wherein the tin compound may be that hereinafter listed in Column A, and the dimercapto compound may be listed hereinafter in Column B.

| | Column A | Column B |
|---|---|---|
| Example No.: | | |
| 2 | di-n-Octyltin oxide | α,α'-Dimercapto-p-xylene. |
| 3 | Diphenyltin oxide | Do. |
| 4 | di-n-Butyltin oxide | α,α'-Dimercapto-m-diethylbenzene. |
| 5 | di-p-Tolyltin oxide | α,α'-Dimercapto-p-dipropylbenezne. |
| 6 | di-n-Amyltin oxide | α,α'-Dimercapto-o-xylene. |
| 7 | di-Cyclohexyltin oxide | α,α'-Dimercapto-p-diethylbenzene. |
| 8 | Diallyltin oxide | α,α'-Dimercapto-m-xylene. |
| 9 | Dibenzyltin oxide | α,α'-Dimercapto-p-xylene. |

EXAMPLES 10, 11 AND 12

Stabilized vinyl chloride polymer compositions were prepared by blending 2.0 parts by weight of stabilizer with 100 parts by weight of vinyl chloride polymer in accordance with the procedure hereinbefore described. The vinyl chloride polymer employed was the homopolymer of vinyl chloride having a specific gravity of 1.40, a Shore durometer D hardness of 80, and an ultimate tensile strength of 7000 p.s.i.—sold under the trademark Geon 103EP. The stabilized composition of this invention (Example 10) and compositions stabilized with prior art organotin stabilizers (Examples 11 and 12) were tested according to the heat stability test hereinbefore described. The results of these comparative tests are set forth in Table I, wherein "Minutes to Failure" represents the length of time required for the sample to reach a value of 3 or less.

TABLE I

| Example No. | Stabilizer Employed | Minutes to Failure |
|---|---|---|
| 10 | di-n-Butyltin p-xylene α,α'-dimercaptide | 75 |
| 11 | di-n-Butyltin bis (isooctyl mercaptoacetate)-control | 45 |
| 12 | di-n-Butyltin bis (lauryl mercaptide)-control | 45 |

As may be seen from Table I, vinyl chloride polymer compositions stabilized in accordance with this invention may be characterized by heat stability which is unexpectedly superior to that of prior art stabilized compositions. Other dihydrocarbontin dialkylbenze α,α'-dimercaptide stabilizers, as hereinbefore noted, may be similarly tested and found to stabilize vinyl chloride polymers in the same manner as the di-n-butyltin p-xylene α,α'-dimercaptide.

It may also be possible to employ the novel dihydrocarbontin dialkylbenzene α,α'-dimercaptide stabilizers of this invention in combination with other stabilizers for halogen-containing resins. Typically, the stabilizers of this invention may be employed in combination with other organotin stabilizers such as dibutyltin dilaurate, dibutyltin maleate, dibutyltin bis (lauryl mercaptide), dibutyltin bis (lauryl maleate) and their dioctyltin analogues. A preferred organotin stabilizer for use in combination with the stabilizers of this invention may be dibutyltin bis (isooctyl maleate). The total amount of both stabilizers may be about 0.5–10%, and preferably 2–4% by weight of the resin composition. The dihydrocarbontin dialkylbenzene α,α'-dimercaptide may be employed in the amount of about 0.25–4 parts by weight per part by weight of the other organotin stabilizer. A preferred stabilizer composition may comprise 1 part by weight of dibutyltin p-xylene α,α'-dimercaptide and 1 part by weight of dibutyltin bis (isooctyl maleate).

Although this invention has been illustrated by reference to specific examples, modifications thereof which clearly fall within the scope of the invention will be apparent to those skilled in the art. It is, therefore, to be limited solely by the scope of the appended claims.

I claim:

1. As a class of compounds, the dihydrocarbontin dialkylbenzene α,α'-dimercaptides.

2. As a class of compounds, the dihydrocarbontin dialkylbenzene α,α'-dimercaptides having the formula

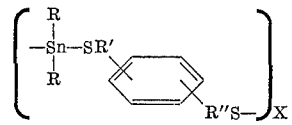

wherein R is a hydrocarbon radical selected from the group consisting of the lower alkyl and phenyl radicals, R' and R" are selected from the group consisting of alkyl radicals containing 1–3 carbon atoms, and $x$ is at least one.

3. As a class of compounds, the dihydrocarbontin dialkylbenzene α,α'-dimercaptides wherein said benzene is additionally substituted by methyl.

4. As a compound, dibutyltin p-xylene α,α'-dimercaptide.

5. As a compound, dioctyltin p-xylene α,α'-dimercaptide.

6. As a compound, diphenyltin p-xylene α,α'-dimercaptide.

References Cited

UNITED STATES PATENTS

| 2,731,484 | 1/1956 | Best | 260—45.75 |
| 2,872,468 | 2/1959 | Leistner et al. | 260—429.7 |
| 2,885,415 | 5/1959 | Ramsden | 260—429.7 |
| 2,888,435 | 5/1959 | Wallace | 260—45.75 |
| 3,015,644 | 1/1962 | Leistner et al. | 260—45.75 |
| 3,053,909 | 9/1962 | Davis et al. | 260—651 |

TOBIAS E. LEVOW, *Primary Examiner.*

W. F. W. BELLAMY, *Assistant Examiner.*